(12) United States Patent
Lopez et al.

(10) Patent No.: US 9,782,715 B2
(45) Date of Patent: Oct. 10, 2017

(54) LOAD FOLLOWING SINGLE BED REVERSING BLOWER ADSORPTION AIR SEPARATION SYSTEM

(71) Applicant: Pacific Consolidated Industries, LLC, Riverside, CA (US)

(72) Inventors: Javier Lopez, Corona, CA (US); Jason Burns, Irvine, CA (US); William K. Goshay, Porter Ranch, CA (US); Tarik Naheiri, Dana Point, CA (US)

(73) Assignee: Pacific Consolidated Industries, LLC, Riverside, CA (US)

( * ) Notice: Subject to any disclaimer, the term of this patent is extended or adjusted under 35 U.S.C. 154(b) by 0 days.

(21) Appl. No.: 14/971,062

(22) Filed: Dec. 16, 2015

(65) Prior Publication Data

US 2016/0184762 A1 Jun. 30, 2016

Related U.S. Application Data

(60) Provisional application No. 62/098,052, filed on Dec. 30, 2014.

(51) Int. Cl.
*B01D 53/047* (2006.01)
*B01D 53/06* (2006.01)
(Continued)

(52) U.S. Cl.
CPC ........... *B01D 53/002* (2013.01); *B01D 53/02* (2013.01); *B01D 53/0476* (2013.01);
(Continued)

(58) Field of Classification Search
CPC ...... B01D 53/02; B01D 53/22; B01D 53/229; B01D 53/002; B01D 53/0476;
(Continued)

(56) References Cited

U.S. PATENT DOCUMENTS 4,648,888 A * 3/1987 Rowland ............... A61M 16/10
95/130
5,258,056 A 11/1993 Shirley
(Continued)

FOREIGN PATENT DOCUMENTS

JP 2005-058469 3/2005

*Primary Examiner* — Frank Lawrence
(74) *Attorney, Agent, or Firm* — Heisler & Associates

(57) ABSTRACT

An exemplary single bed reversing blower adsorption based air separation unit is configured to follow the $O_2$ load placed thereon by adjusting flow rates therethrough and power consumption. At least one and preferably multiple pressure sensors sense $O_2$ pressure within an $O_2$ storage region downstream of an adsorber vessel. These sensed pressures are utilized to generate control signals controlling flow rates at locations upstream of the compressor, such as at a reversible blower and an output compressor. Control loops for the blower and the compressor are independent of each other and have different time constants. Effective following of the $O_2$ load is thus achieved without driving the air separation unit into operational conditions outside of design and also maintaining optimal power consumption for the $O_2$ produced, such that efficiency is maintained over a large turndown ratio.

17 Claims, 7 Drawing Sheets

Purge Step

(51) Int. Cl.
*B01D 53/00* (2006.01)
*B01D 53/02* (2006.01)
*B01D 53/22* (2006.01)
*B01D 63/02* (2006.01)
*B01D 53/053* (2006.01)

(52) U.S. Cl.
CPC ........... *B01D 53/22* (2013.01); *B01D 53/229* (2013.01); *B01D 63/02* (2013.01); *B01D 53/053* (2013.01); *B01D 2256/12* (2013.01); *B01D 2257/102* (2013.01); *B01D 2257/11* (2013.01); *B01D 2257/40* (2013.01); *B01D 2257/80* (2013.01); *B01D 2259/401* (2013.01); *B01D 2259/402* (2013.01); *B01D 2259/40007* (2013.01); *B01D 2259/40009* (2013.01)

(58) Field of Classification Search
CPC .. B01D 53/053; B01D 63/02; B01D 2256/12; B01D 2257/102; B01D 2257/11; B01D 2257/40; B01D 2257/80; B01D 2259/40007; B01D 2259/40009; B01D 2259/401; B01D 2259/402

USPC .... 95/95–98, 100–102, 130, 19, 22; 96/109, 96/113, 114, 143
See application file for complete search history.

(56) References Cited

U.S. PATENT DOCUMENTS

| | | | | |
|---|---|---|---|---|
| 7,682,428 | B2* | 3/2010 | Nawata | A61M 16/10 |
| | | | | 128/205.12 |
| 7,766,010 | B2* | 8/2010 | Jagger | A61M 16/10 |
| | | | | 128/202.21 |
| 9,492,781 | B2* | 11/2016 | Galbraith | A61M 16/10 |
| 2002/0096174 | A1* | 7/2002 | Hill | A61M 16/10 |
| | | | | 128/205.11 |
| 2010/0024640 | A1* | 2/2010 | Blouin | G05B 13/024 |
| | | | | 95/21 |
| 2010/0071698 | A1* | 3/2010 | Kiritake | A61M 16/009 |
| | | | | 128/205.27 |
| 2010/0095841 | A1 | 4/2010 | Naheiri | |
| 2013/0061747 | A1 | 3/2013 | Turnbull | |
| 2013/0125746 | A1* | 5/2013 | Manning | B01D 53/0473 |
| | | | | 95/19 |

* cited by examiner

LOAD FOLLOWING SINGLE BED REVERSING BLOWER ADSORPTION AIR SEPARATION SYSTEM

CROSS-REFERENCE TO RELATED APPLICATIONS

This application claims benefit under Title 35, United States Code §119(e) of U.S. Provisional Application No. 62/098,052 filed on Dec. 30, 2014.

FIELD OF THE INVENTION

The following invention relates to air separation units for separation of oxygen from air, such as utilizing a single bed reversing blower adsorption based air separation unit. More particularly, this invention relates to single bed reversing blower adsorption based air separation units which can have an oxygen supply therefrom efficiently adjusted to match an oxygen demand from the air separation unit.

BACKGROUND OF THE INVENTION

The production of oxygen using vacuum swing adsorption (VSA) is well-known to air separation technologists. VSA offers a simple non-cryogenic method to produce gaseous oxygen at purities of 80% to 95%. In the last 20 years oxygen VSA plants have become widespread and are offered in various bed configurations. The multi-bed VSA is typically used in the size rage of 60 tons per day (TPD) and higher. The single bed process was adopted as a lower capital, simpler process for lower production ranges, typically 1 TPD up to 40 TPD. Typical single bed systems usually consist of a single blower train that is used for both the feed air provider as well as the regeneration vacuum system. The process usually incorporates automatic valves to direct the air and vacuum flows during the cycle. A newer embodiment of the single bed process uses a reversing blower to generate the feed stream and apply vacuum for the regeneration step. This latest embodiment is well suited for small to medium sized oxygen VSA production plants (1 to 10 TPD). One example of a single bed reversing blower (SBRB) VSA process of this type is described in U.S. Pat. No. 8,496,738.

Although the single bed reversing blower (SBRB) VSA process is simple in practice, its simplicity comes with performance trade-offs when compared to multi-bed systems. Firstly, the lack of additional adsorber beds does not allow for a crucial bed to bed equalization. The pressure equalization step is key to lowering power consumption and increasing product oxygen recovery. Technologists in the art have overcome this deficiency by adding an equalization tank to the SBRB system (such as equalization tanks in SBRB systems provided by Air Liquide of Houston, Tex.).

Another waste of power in any adsorption process is the poor turndown ratio of the process. In a multi-bed, dual blower system turndown is limited by the fact that the blowers must remain powered up. One option for turndown in such systems consists of running the feed blower discharge into the vacuum system suction piping, in effect short circuiting the VSA process. While not particularly efficient, the blowers are allowed to run unloaded, saving some power.

SUMMARY OF THE INVENTION

In a single bed system one can use variable frequency drives for the motor to achieve a significant and efficient turndown ratio, typically down to twenty-five percent to ten percent of name plate. However, it is difficult to construct an algorithm to control the variable frequency drive appropriately to achieve the efficient turndown ratio desired. To provide such a control algorithm according to this invention, a product buffer storage tank located downstream of the adsorber vessel monitors pressure levels therein. Adsorption equilibrium is dynamically managed by adjusting the inlet flow rate into the adsorption vessel according to feedback received from the pressure levels within the buffer storage tank.

Following such an algorithm, and with inputs of pressure from the product buffer storage tank providing control of an inlet flow rate into the adsorber bed, vessel flow rates and velocities far below design center are provided which still maintain high purity and adsorption equilibrium with lower power required and with lower product gas (typically oxygen) output. Such a system can further include control from an operator selecting an amount of turndown to be provided, causing the system to operate closer or further away from design center, but still maintaining adsorption equilibrium and product gas purity, and with lower power draw.

In an optimized embodiment of this invention, pressure is sensed at two locations and oxygen production rates and power required for such oxygen production are controlled by the two sensed pressures. A first pressure is sensed at a first location which is preferably at an $O_2$ buffer tank (also called an $O_2$ process tank) within an $O_2$ storage area downstream of the adsorption bed. This first pressure is utilized to control a flow rate through the reversible blower. In particular, if the sensed pressure at the first location is greater than a pressure set point, indicative of overpressure and slack demand for oxygen, flow rate through the reversible blower is reduced. Specifically, the blower is driven at a slower speed so that its flow rate therethrough (whether forward or rearward) is reduced. In one embodiment, the blower is driven by a variable frequency drive which can be readily controlled to achieve a lower flow rate therethrough. At such a lower flow rate, oxygen is produced more slowly by passing air more slowly through the adsorption bed. Oxygen thus flows on into the buffer tank more slowly, tending to decrease pressure therein. If, alternatively, the pressure sensed at this first location is decreasing, such a decreasing pressure is indicative of increased demand for oxygen from the system. Such a decreased pressure is fed back through a controller to the reversible blower to increase a flow rate through the reversible blower.

Additionally, pressure is preferably sensed at a second location in a preferred form of the invention. The second pressure is sensed downstream of a compressor which is downstream of the buffer tank and supplies pressurized oxygen from the system. The second pressure sensed at the second location downstream of the compressor is compared to a set point. If this second pressure is sensed to be higher than the set point, this is indicative of slack $O_2$ demand and is fed back to the compressor to cause the compressor to operate at a lower power and lower flow rate therethrough. If, alternatively, the pressure is sensed to be lower than the set point at the second location, this is indicative of heightened demand and the compressor is driven at a higher flow rate with greater corresponding power consumption. In this way, the compressor is also acting responsive to oxygen demand.

These two separate feedback loops both sense pressure and feedback a control signal to increase or decrease flow rate through upstream equipment. To keep the equipment operating in harmony with each other and avoiding circumstances where the two control systems respond to each other rather than to actual $O_2$ load/demand, a time interval at which the two control systems pause between sensing pressure and adjusting flow rates associated with each control loop are set to be distinct from each other. In one embodiment, the compressor control system senses pressure approximately every second and responds appropriately. At the same time, the buffer tank pressure sensed at the first location is allowed to adjust reversible blower flow rate approximately every minute.

The presence of the buffer tank and the volume thereof ensures that rapidly increasing demand sensed at the second location can be responded to by the compressor and the compressor will not exhaust the supply within the buffer tank before the heightened demand is sensed and responded to at the first location within the buffer tank, causing the reversible blower to increase flow rate and produce oxygen more quickly. Correspondingly, if oxygen demand sensed by the pressure sensor at the second location decreases rapidly, causing the compressor to operate at a significantly lower flow rate, the buffer tank is sufficiently large that the reversible blower can continue at a high flow rate (for approximately a minute) to produce oxygen which can be stored up in the buffer tank, with such oversupply being readily absorbed within the buffer tank for the up to one minute time period that such a rapidly decreasing demand might cause, before the sensed increased pressure in the buffer tank causes a reduction in the flow rate of the reversible blower. Stable load following is thus achieved and efficient oxygen production is maintained even with a turned down ratio of fifty percent, seventy-five percent or more.

OBJECTS OF THE INVENTION

Accordingly, a primary object of the present invention is to provide a single bed reversing blower (SBRB) vacuum swing adsorption (VSA) or other adsorption based air separation unit which can flexibly meet demand over a wide range, by effectively matching $O_2$ demand with flow rates within the air separation unit.

Another object of the present invention is to provide a single bed reversing blower air separation unit which maintains efficient operation even when $O_2$ demand varies widely.

Another object of the present invention is to provide an SBRB VSA air separation unit which can maintain continuous operation at variable flow rates and avoid excessive start up and shut down cycles, while meeting variable $O_2$ demand.

Another object of the present invention is to provide an air separation unit which operates in a manner following the load placed on the air separation unit with a high turn down ratio while still maintaining efficient $O_2$ producing operation.

Another object of the present invention is to provide a method for controlling flow rates of equipment within an adsorption based air separation unit to efficiently respond to changes in $O_2$ load.

Other further objects of the present invention will become apparent from a careful reading of the included drawing figures, the claims and detailed description of the invention.

BRIEF DESCRIPTION OF THE DRAWINGS

FIG. 5 also includes a control system implemented by a controller and multiple sensors and control outputs, to facilitate load following for the air separation unit according to this invention.

DESCRIPTION OF THE PREFERRED EMBODIMENT

Figure 1:
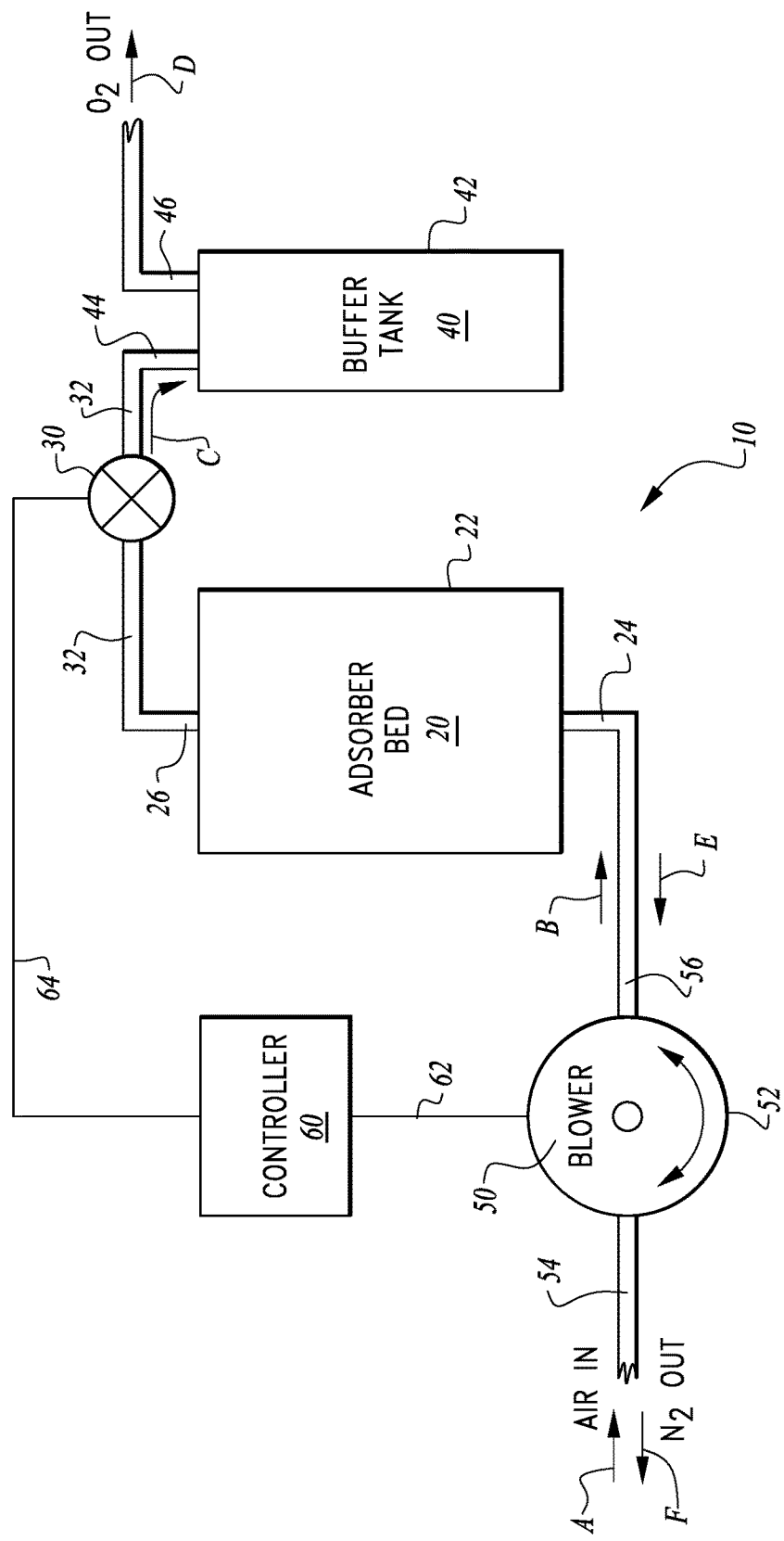
FIG. 1 is a schematic of a prior art single bed reversing blower vacuum swing adsorption air separation unit typical for which the technology of this invention is addressed.

Referring to the drawings, wherein like reference numerals represent like parts throughout the various drawing figures, reference numeral 10 (FIG. 1) is directed to a prior art oxygen separator configured to separate/concentrate oxygen from air. This separator is modified by the air separation unit 110 of this invention (FIGS. 2-5) and the blower driving system 210 of this invention (FIG. 4), as explained in detail below.

In essence, and with particular reference to FIG. 1, basic details of the oxygen separator 10 modified by the air separation unit 110 and blower driving system 210 of this invention are disclosed. The oxygen separator 10 includes an adsorber bed 20 including an adsorber material therein which preferentially adsorbs nitrogen, $CO_2$ and water over oxygen. A valve 30 is located downstream of the adsorber bed 20. A buffer tank 40 is provided downstream of the valve 30. A blower 50 defines a preferred form of pump located upstream of the adsorber bed 20. A controller 60 is coupled to the valve 30 and the blower 50 (or other pump) to control opening and closing of the valve 30 and to control a direction in which the blower 50 (or other pump) is operating, to either provide air into the adsorber bed 20 or pull a vacuum to desorb and remove nitrogen out of the adsorber bed 20. Normally, a heat exchanger is required between the blower and the adsorber bed to remove the heat generated when the air is compressed. The heat exchanger may be bypassed during the vacuum phase of the cycle.

With continuing reference to FIG. 1, details of the adsorber bed 20 are described. The adsorber bed 20 includes an enclosure 22 for containing the adsorber material. This enclosure 22 includes an inlet 24 spaced from an outlet 26. The inlet 24 and outlet 26 define preferred forms of first and second ports for access into the enclosure 22. The inlet 24 and outlet 26 normally are incorporated in closures or "end plates" which can be removed to allow access to the adsorption components in the enclosure 22. Otherwise, the enclosure 22 is preferably sealed to prevent leakage of gases into or out of the enclosure 22.

The adsorber material within the adsorber bed 20 could be any form of material which preferentially adsorbs nitrogen over oxygen. One such material is molecular sieve such as nitroxy siliporite. This material is preferably supplied in the form of beads which are either generally spherical in form or can be of irregular shape. Since the beads are composed of molecular sieve material within the enclosure 22, gaseous pathways extend through, between and around the adsorbent material.

Most preferably, a plenum is configured at the inlet and the outlet end of the adsorber bed to provide even gas flow across the cross section of the bed. In a preferred configuration, the inlet 24 is located below the outlet 26, and with the inlet 24 at a lowermost portion of the enclosure 22 and the outlet 26 on an uppermost portion of the enclosure 22. The enclosure 22 could have a variety of different shapes. In one embodiment, the enclosure 22 could be generally rectangularly shaped. The enclosure could be shaped like a pressure vessel to maximize an amount of vacuum to be drawn on the enclosure 22 while minimizing an amount of material strength (i.e. wall thickness or material choice) that must be designed into the enclosure 22. If the size of the adsorber material is sufficiently small to potentially pass through the inlet 24 or outlet 26, filters are provided at the inlet 24 and outlet 26 to keep the adsorbent material within the enclosure 22.

With continuing reference to FIG. 1, details of the valve 30 are described. The valve 30 is interposed on a line 32 extending from the outlet 26 of the adsorber bed 20 and extending to the buffer tank 40. This line 32 is preferably substantially rigid, especially between the valve 30 and adsorber bed 20, so that when a vacuum is drawn on the adsorber bed 20, the line 32 does not collapse. The valve 30 is preferably sealed to prevent leakage in any manner when in a closed position and to only allow passage of gas along the line 32 when in an open position.

The valve 30 is preferably coupled to a controller 60 which controls the opening and closing of the valve 30. Optionally, the valve 30 could have a controller built into the valve 30 that could be set a single time and then operate in accordance with its settings.

While the valve 30 would typically be programmed once and then operate in accordance with such settings, the valve 30 could optionally be controlled at least partially through a control system including sensors and feedback to the valve 30. For instance, an oxygen sensor could be provided adjacent the valve 30 or along the line 32 between the valve 30 and the adsorber bed 20 to detect oxygen concentration levels approaching the valve 30. Nitrogen adjacent the valve 30 would be indicative that the adsorbent material within the adsorber bed 30 is saturated with nitrogen and that the oxygen separator 10 needs to change operating modes, to have the blower 50 (or other pump) reverse to pull a vacuum and desorb nitrogen from the adsorber material and pull the nitrogen out of the adsorber bed 20 to recharge the system.

Normally control of the cycle is achieved with the use of pressure transducers which reverse the blower at appropriate times. Usually the purge cycle is initiated when the vacuum reaches a certain predetermined level. The valve 30 is then opened for a predetermined amount of time so that a purge layer of oxygen is allowed to purge the remaining nitrogen from the bed. So the pressure and vacuum cycle are determined by pressure and the purge portion of the cycle is timed.

Other sensors could also potentially be utilized to allow the oxygen separator 10 to operate most effectively. The valve 30 is preferably of a type which operates with a minimum of lubricant or which can operate with a lubricant which is compatible with the handling of oxygen. The valve 30 and other portions of the oxygen separator 10 are also preferably formed of materials which are compatible with the handling of oxygen. For instance, brass is often effective in handling of oxygen and so brass is one material from which the valve 30 could be suitably manufactured when the system 10 is used for oxygen separation.

With continuing reference to FIG. 1, details of the buffer tank 40 are described. The buffer tank 40 is not strictly required for operation of the system, but allows for the system in the form of the oxygen separator 10 to deliver oxygen substantially continuously, and to moderate pressure spikes in the system. The buffer tank 40 includes an enclosure 42 with an input 44 and an output 46 in FIG. 1. However, normally the buffer tank does not have a separate inlet and outlet. Since its purpose is simply to be an accumulator and minimize the pressure fluctuations inherent in the pressure swing adsorption process. The input 44 is coupled to the line 32 on a side of the valve 30 downstream from the adsorber bed 20.

The buffer tank 40 would typically have some form of regulator valve on the output 46 which would deliver oxygen out of the buffer tank 40 when oxygen is required by oxygen utilizing systems downstream of the buffer tank 40. The input 44 of the buffer tank 40 can remain in fluid communication with the valve 30. The buffer tank 40 can contain oxygen at above atmospheric pressure and at a pressure matching or slightly below an operating pressure of the adsorber bed 20 when the adsorber bed 20 is actively adsorbing nitrogen and oxygen flows into the buffer tank 40.

A sensor can be associated with the buffer tank 40 which cooperates with the controller 60 to shut off the oxygen separator 10 when the buffer tank 40 nears a full condition. In many applications a compressor is located downstream from the buffer tank 40 to fill oxygen vessels. When the vessels are full the system would be shut off. If required, a pressure regulator can also be provided on the output 46 of the buffer tank 40 so that pressure of oxygen supplied out of the buffer tank 40 remains substantially constant. Similarly, an oxygen pump could be provided downstream of the buffer tank 40 if the oxygen were required to be supplied at an elevated pressure above pressure within the buffer tank 40.

Most preferably, the buffer tank 40 is not a particularly high pressure tank so that the oxygen separator 10 including the blower 50 (or other pump) and adsorber bed 20 do not need to operate at a particularly high pressure when delivering oxygen to the buffer tank 40. By minimizing the pressure of the buffer tank 40, the weight of the buffer tank 40 (and other components of the system 10) can be significantly reduced. Furthermore, the power consumed by the blower is reduced as the pressure drop across the blower is reduced.

With continuing reference to FIG. 1, details of the blower 50 (or other pump) are described. This blower 50 generally includes a housing 52 with some form of prime mover therein coupled to a driver, such as an electric motor. The housing 52 of the blower 50 includes an entry 54 in direct access with a surrounding environment in a preferred embodiment. A discharge 56 is also provided on the housing 52 which is located on a side of the blower 50 closest to the adsorber bed 20.

The blower 50 is preferably in the form of a two or three lobed rotary blower coupled in direct drive fashion to an electric motor. In one embodiment the electric motor is a five horsepower three phase motor and the rotary blower is a two or three lobed blower and can deliver approximately one hundred cubic feet per minute when operating at atmospheric pressure. This rotary blower is also preferably configured to have acceptable performance when drawing a vacuum on the adsorber bed 20.

The lobes of the rotary blower are preferably configured so that they are of approximately similar efficiency in moving gases through the blower 50 between the entry 54 and the discharge 56 in either direction. In one form, the lobes are thus symmetrical in form so that they act on the air similarly in both directions of rotation for the blower 50.

The blower 50 is preferably substantially of a positive displacement type so that it maintains an adequate performance when drawing a vacuum on the adsorber bed 20 so that nitrogen can be effectively desorbed from the adsorber material in the adsorber bed 20 when the blower 50 is operating in a reverse direction to pull nitrogen out of the adsorber bed 20 and deliver the nitrogen out of the entry 54.

Most preferably, the blower 50 is coupled in direct drive fashion to the electric motor (or though a gear box). Most preferably, the electric motor is a three phase alternating current motor which can easily be reversed by reversing two of the phases. In this way, the controller 60 need merely reverse two poles of the three phase motor. In an other embodiment a direct current, permanent magnet may be used wherein the direction of the rotation can be reversed by reversing the polarity which in turn will reverse the rotation of the blower. Almost all three phase electric motors are capable of being reversed as above. Direct current motors are also readily available from many manufacturers which reverse their rotation direction by changing polarity.

Other types of pumps could alternatively be utilized for drawing air into the adsorber bed 20 and pulling nitrogen out of the adsorber bed 20 for the oxygen separator 10. For instance, such a pump could be a positive displacement pump, such as a piston pump or a peristaltic pump. Other forms of positive displacement pumps could also be utilized including gerotor pumps, gear pumps, etc. Other forms of pumps rather than strictly positive displacement pumps could also be selected, such as centrifugal pumps or axial flow pumps. The most efficient scheme for pumping the air into the system and exhausting the bed depends on the requirements of the final user.

With continuing reference to FIG. 1, details of the controller 60 are described according to a preferred embodiment. The controller 60 is shown as a separate unit coupled to the blower 50 (or other pump) through a blower signal line 62 and coupled to the valve 30 through a valve signal line 64. The controller 60 could in fact be integrated into the valve 30 or integrated into the blower 50 (or other pump) or be provided as a standalone unit such as depicted in FIG. 1. It is also understood that the controller 60 could be split into two (or more) separate devices, either separate from the blower 50 and valve 30 or integrated into both the blower 50 and valve 30.

The controller 60 provides the basic function of controlling a direction in which the blower 50 is operating and whether the valve 30 is open or closed. Control systems have been used which simply time the cycle. More often, the controller is configured to react to pressure or some other input.

A preferred sequence for directional control of the blower 50 and opening and closing of the valve 30 are described in detail below. The controller 60 could be in the form of a programmable logic device or could be in the form of an application specific integrated circuit, or could be in the form of a CPU of a special purpose computer or a general purpose personal computer or other computing device. The controller 60 could be configured to have operating parameters set at a central controlled location, such as during manufacture, or could be configured to allow for programming in the field before and/or during operation.

In use and operation, and with particular reference to FIG. 1, details of the operation of the oxygen separator 10 of the prior art are described. It will be understood that the separator 10 would operate similarly when separating other gases than when separating oxygen from air, and the operation as an oxygen separator 10 is provided merely as one example.

Initially, the system 10 is configured with the valve 30 closed and the blower 50 (or other pump) is caused to rotate in a direction driving gases out of the adsorber bed 20 (along arrow E). This is the vacuum cycle used to desorb nitrogen out of the beads in the bed 20. In particular, the blower 50 rotates to cause gases to be pulled into the entry 54 (along arrow E). This gas is removed from the bed 20 by the blower 50 and caused to pass through the discharge 54 away from the adsorber bed 20 along arrow F and to the surrounding atmosphere.

Nitrogen (or other undesirable gas) is adsorbed by the adsorber material within the adsorber bed 20. Most typically, the adsorber material also adsorbs water vapor and carbon dioxide, as well as potentially trace amounts of other gases, including pollutants.

During the last portion of the vacuum cycle valve 30 is opened to allow a small amount of the contents of the buffer tank to be introduced into the adsorber bed. This step is called the "purge phase." The purge phase is used to purge nitrogen (as well as some carbon dioxide and water out of plumbing lines and free space between the valve 30 and the blower 50, but not appreciably out into the surrounding atmosphere. This short purge phase is typically timed to match an amount calculated or determined by experiment, but could also be ended based on sensor readings. This purge phase ends the vacuum cycle and precedes the adsorption cycle to follow.

The blower is then reversed to commence the adsorption cycle. Air is drawn into the blower at the inlet 54 port of the blower 50 (in the direction shown by arrow A). The air flows (along arrow B) into the adsorber bed 20 where nitrogen, carbon dioxide, and water are preferentially adsorbed. The gas not adsorbed in the adsorber bed (normally a mixture of oxygen and argon) is passed through valve 30 into the buffer tank 40.

The adsorber bed 20 might also adsorb oxygen to some extent. However, the adsorber material is selected so that it preferentially adsorbs nitrogen more than oxygen. Due to the presence of the adsorber material within the adsorber bed 20, substantially only oxygen (or other desirable gas) can leave the adsorber bed 20 through the outlet 26. Typically, argon also remains with the oxygen. Because air is approximately 1% argon and approximately 20% oxygen, this twenty to one ratio typically causes the gases being discharged from the adsorber bed 20 at the outlet 26 to be approximately 95% oxygen and 5% argon.

Because the valve 30 is opened, this oxygen can flow (along arrow C) through the valve 30 and into the buffer tank 40. The buffer tank 40 is thus charged with oxygen. If oxygen is desired, it can be discharged from the buffer tank 40 output 46 (along arrow D). The adsorber material within the adsorber bed 20 eventually becomes saturated with nitrogen and other compounds, such as water vapor and carbon dioxide. The point of such saturation can be calculated in advance and calibrated into the separator 10. Alternatively, a sensor can be provided, such as along the line 32 adjacent the valve 30, to sense for nitrogen or other contaminants within what should be substantially only oxygen and argon. Such a sensor can cause the system to detect such saturation of the adsorbent material within the adsorber bed 20 and thus change the mode of operation of the oxygen separator 10 from the adsorption cycle to the vacuum cycle. Other sensors to trigger the change could be pressure sensors or volumetric flow rater sensors either alone or in combination with a clock or a calibration table. The goal is to prevent nitrogen or other contaminates from passing the valve 30 after adsorption bed 20 saturation.

When such saturation has either been sensed as occurring or predicted to occur, the separator 10 changes operation modes by closing the valve 30. Then the blower 50 (or other pump) reverses its direction of operation. For instance, the controller 60 can reverse two of the three phases of a three phase electric motor coupled to the blower. The blower 50 is then caused to turn in an opposite direction and begins pulling gas (along arrow E) out of the adsorber bed 20 and into the blower 50 from the discharge 56 and out of the blower 50 through the entry 54 and out into a surrounding environment, as a repeat of the vacuum cycle described above.

The controller 60 can be programmed with a typical amount of time required to effectively desorb the nitrogen from the adsorbent material within the adsorber bed 20. Normally, the controller 60 senses a threshold low pressure in the adsorber bed 20. The system operation then continues as described above with a short purge phase followed by return to the desorption cycle.

This operating sequence for the oxygen separator 10 can repeat itself potentially indefinitely. When the buffer tank 40 becomes full (or vessels being filled from the buffer tank 40 are full), an appropriate sensor associated with the buffer tank 40 can indicate that it is full and shut off the oxygen separator 10. As further amounts of oxygen are sensed as being needed, such as by a drop in pressure in the buffer tank 40, a signal can be sent to the controller 60 to again cause the system to commence operation.

With this invention a modified air separation unit 110 implements a modification of the prior art single bed reversing blower (SBRB) vacuum swing adsorption (VSA) oxygen separator 10 through the air separation unit 110 of this invention and the driving system 210 described in more detail below. The SBRB VSA air separation unit (ASU) 110 is modified in this exemplary ASU 110 to include a purge recovery tank 160. Many other portions of the ASU 110 have analogs in the prior art SBRB VSA technology such as that shown in FIG. 1.

Figure 2:
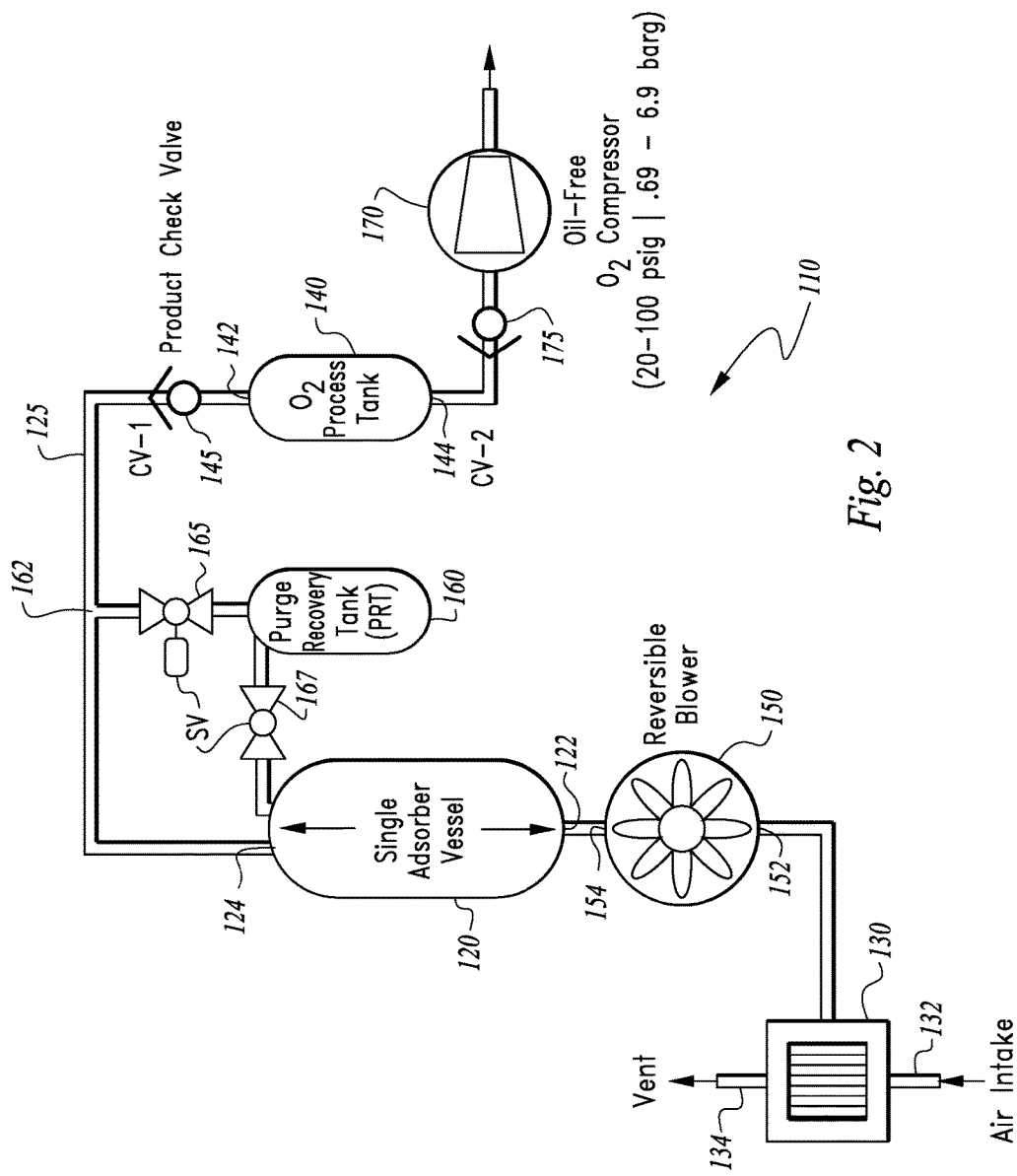
FIG. 2 is a schematic of a single bed reversing blower vacuum swing adsorption air separation unit incorporating a purge recovery tank therein to enhance performance of the air separation unit and defining a modified vacuum swing adsorption air separation process, suitable for implementation of this invention.

In essence, and with particular reference to FIG. 2, basic details of the ASU 110 are described, according to a preferred embodiment with the ASU 110 also typically including many of the details of the oxygen separator 10 as described above. A single adsorber vessel 120 is fed by an intake 130 which supplies air to the vessel 120. Downstream of the vessel 120, an $O_2$ supply line 125 leads to an $O_2$ process tank 140 which is optionally provided to contain excess $O_2$ before it is utilized by equipment and/or for processes downstream of the $O_2$ process tank 140. A reversible blower 150 is interposed between the adsorber vessel 120 and the intake 130. A purge recovery tank 160 is coupled to the $O_2$ supply line 125 downstream of the vessel 120, preferably through a control valve 165 to control whether the purge recovery tank 160 is open or closed. A compressor 170 is preferably provided downstream of the $O_2$ process tank which can control pressure of $O_2$ supplied from the ASU 110.

More specifically, and with continuing reference to FIG. 2, specific details of the ASU 110 are described. The single adsorber vessel 120 extends between an inlet 122 and an outlet 124, with the inlet 122 defining a side of the vessel 120 closest to the intake 130 and the outlet 124 on a side of the vessel 120 opposite the inlet 122. This vessel 120 can have any of a variety of configurations. While this vessel 120 is described as a single adsorber vessel 120, it is conceivable that a manifold upstream and downstream of the single adsorber vessel 120 could be provided so that multiple vessels 120 could be provided in parallel, but operating in unison so that the ASU 110 is still functioning as a single bed reversing blower (SBRB) system but with optionally additional vessels 120 merely to adjust size of the vessel 120.

The vessel 120 contains an adsorption material which preferentially adsorbs $N_2$ over $O_2$. This material is typically provided in the form of beads or other solid media which allow for gas to flow about the solid media as the gas extends from the inlet 122 to the outlet 124, and past surfaces of the adsorption material. Surfaces of the adsorption material adsorb nitrogen thereon, allowing $O_2$ to pass through the vessel 120. Typically, the material within the vessel 120 also adsorbs water vapor and various other gases, while typically argon within the air is not adsorbed but passes out of the vessel 120 along with the oxygen. The vessel 120 includes a container wall which is sufficiently strong so that it can maintain its volume when experiencing pressures ranging from near vacuum at a low end to approximately atmospheric (but potentially slightly higher than atmospheric pressure) at a high end.

The intake 130 in a simplest form merely includes an opening which is open to a surrounding atmosphere for intake of air into the ASU 110. In the embodiment depicted, the intake 130 can include some form of filter element, such as a particulate filter and includes an air port 132 spaced from a purge port 134. A valve within the intake 130 causes air to be drawn in through the air port 132 when the blower 150 is drawing air into the vessel 120, and the purge port 134 discharges gas (including mostly $N_2$) when the blower 150 has reversed and is pulling gas out of the vessel 120. The purge port 134 is preferably spaced from the air port 132 to minimize the potential for nitrogen exhaust to find its way back into the air port 132. If desired, the purge port 134 can lead to other equipment such as nitrogen recovery equipment.

Figure 4:
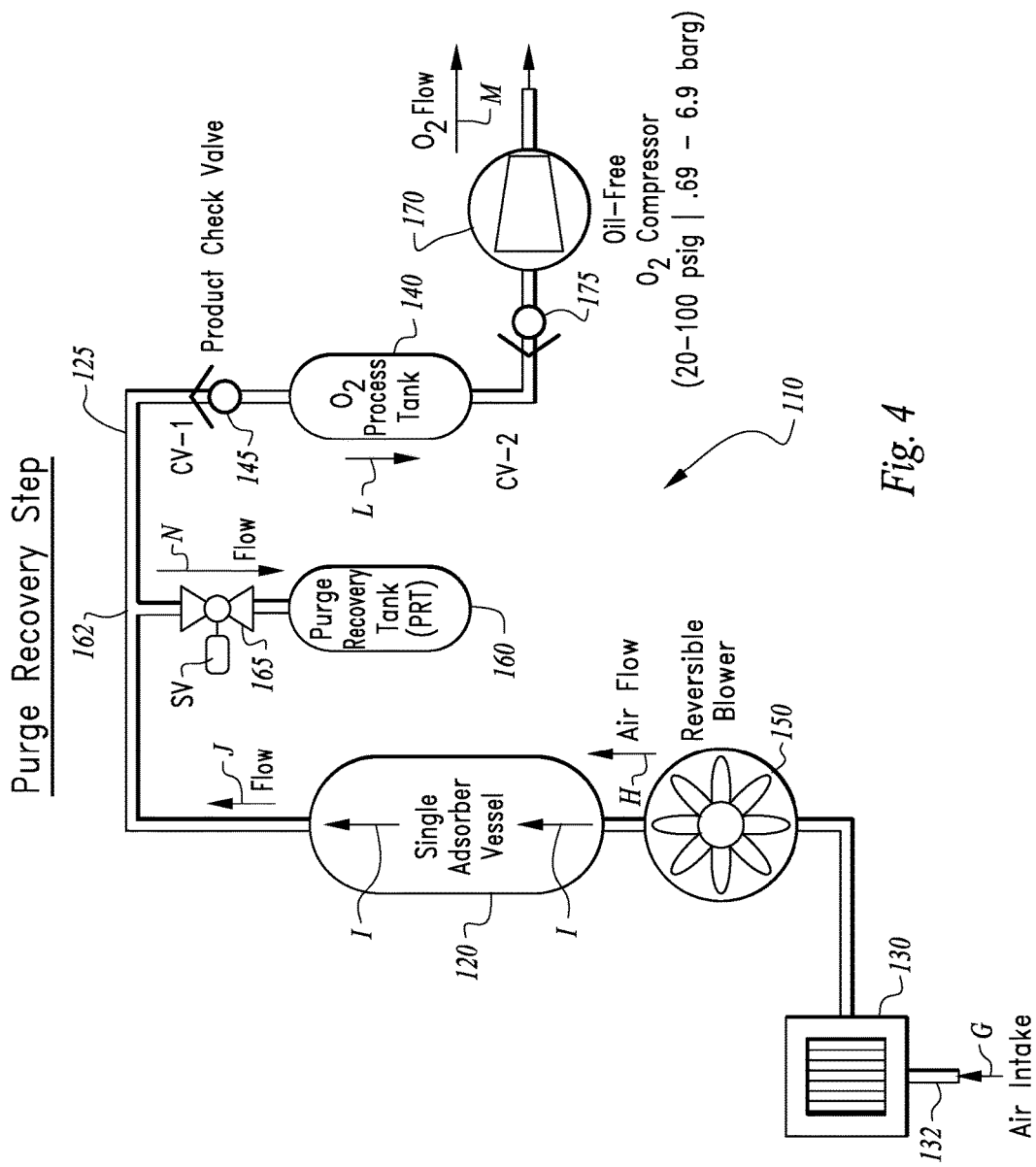

Regions downstream of the vessel 120 are together generally referred to collectively as the $O_2$ output in that gas of mostly $O_2$ remains in these portions of the ASU 110. The $O_2$ process tank 140 could be avoided in systems where oxygen is used as it is produced or where discharge of excess $O_2$ beyond that utilized by the equipment downstream of the ASU 110 can merely be discharged to atmosphere, or can be avoided in systems where downstream equipment from the ASU 110 itself includes appropriate volume, such as in the form of tanks or other equipment so that the $O_2$ process tank 140 is not needed. However, typically an $O_2$ process tank 140 is provided to hold excess $O_2$ produced when the reversible blower 150 is driving air into the vessel 120 and the ASU 110 is producing $O_2$, so that when the blower 150 reverses and the vessel 120 is in recovery mode and discharging nitrogen therefrom, $O_2$ can continue to be supplied from the $O_2$ process tank 140 to supply downstream oxygen utilizing equipment (FIG. 4).

Most preferably, a product check valve 145 is provided upstream of the $O_2$ process tank 140. This check valve 145 acts to keep pressurized oxygen within the $O_2$ process tank 140 and preventing back flow of oxygen back toward the vessel 120. This product check valve 145 also provides one form of valve within the $O_2$ supply line 125 which the reversible blower 150 works against so that an at least partial vacuum can be drawn on the vessel 120, without significant leakage of any gases into the vessel 120 from the $O_2$ supply line 125. Such a vacuum is needed to allow for recovery of the material within the vessel 120 by causing the material to give up the $N_2$ and return to a state where it is ready to again preferentially adsorb $N_2$ and supply $O_2$ to the $O_2$ process tank 140. The $O_2$ process tank 140 includes an inlet 142 opposite an outlet 144 with the inlet 142 adjacent to the product check valve 145 and the outlet 144 leading further into equipment downstream of the ASU 110 which utilize oxygen.

The reversible blower 150 includes an inlet 152 on a side of the reversible blower 150 closest to the intake 130 and an outlet 154 on a side of the reversible blower 150 opposite the inlet 152. This reversible blower 150 is preferably a positive displacement pump, most typically of a rotary lobe variety which can both efficiently blow air through the vessel 120 to produce oxygen, but also effectively draw a vacuum on the vessel 120 when reversed. The motor coupled to the rotary lobe prime mover of the reversible blower 150 is most preferably a type of electric motor which can readily be reversed in direction, such as by reversing a polarity of an electric field associated with the electric motor, or some other type of electric motor which can be readily reversed in the direction that it is operating with a minimum of stress on the equipment associated with the reversible blower 150. Typically, a controller is coupled to the reversible blower 150 which sends a signal at an appropriate time to the reversible blower 150 to cause it to reverse from pushing air into the vessel 120 to pulling gas out of the vessel 120.

The purge recovery tank 160 is preferably provided with an opening thereinto coupled to the $O_2$ supply line 125, preferably at a junction 162 between the outlet 124 of the vessel 120 and the product check valve 145. As an alternative, the purge recovery tank 150 can be coupled directly to the adsorber vessel 120 typically at a portion of the adsorber vessel 120 on a side of the vessel 120 opposite the inlet 122.

A control valve 165 is interposed between the tank 160 and the $O_2$ supply line 125. Alternatively, this control valve 167 can be interposed between the tank 160 and the vessel 120. In either configuration, the control valve 165, 167 transitions from a closed state where the purge recovery tank 160 is isolated from the $O_2$ supply line 125 and the adsorber vessel 120 and an open state where the purge recovery tank 160 is open to the $O_2$ supply line 125 and/or adsorber vessel 120. The control valve 165, 167 is typically coupled to a servo motor so that it is in the form of a servo valve (SV).

The control valve 165 is coupled to a controller which can be coupled to or the same as the controller associated with the reversible blower 150, so that opening and closing of the purge recovery tank 160 occurs in a synchronized fashion with reversing of the reversible blower 150. If desired, such a controller or group of controllers can also be coupled to sensors such as a nitrogen sensor which can detect trace amounts of $N_2$ downstream of the vessel 120 and indicative that the material within the vessel 120 is approaching saturation and the need to enter a recovery phase by reversing the reversible blower 150 and drawing nitrogen out of the vessel 120 through drawing a vacuum within the vessel 120. The controller can optionally include a clock and reverse the blower (and open/close the valve 165, 167) after set amounts of time have passed.

The compressor 170 is optionally provided downstream of the $O_2$ supply line 125 and downstream of any $O_2$ process tank 140. Preferably a compressor check valve 175 is provided upstream of the compressor 170. The compressor 170 allows for control of a pressure desired for $O_2$ supplied from the ASU 110. The compressor check valve 175 assists in keeping $O_2$ downstream of the compressor 170 from backing up into the ASU 110.

Figure 3:
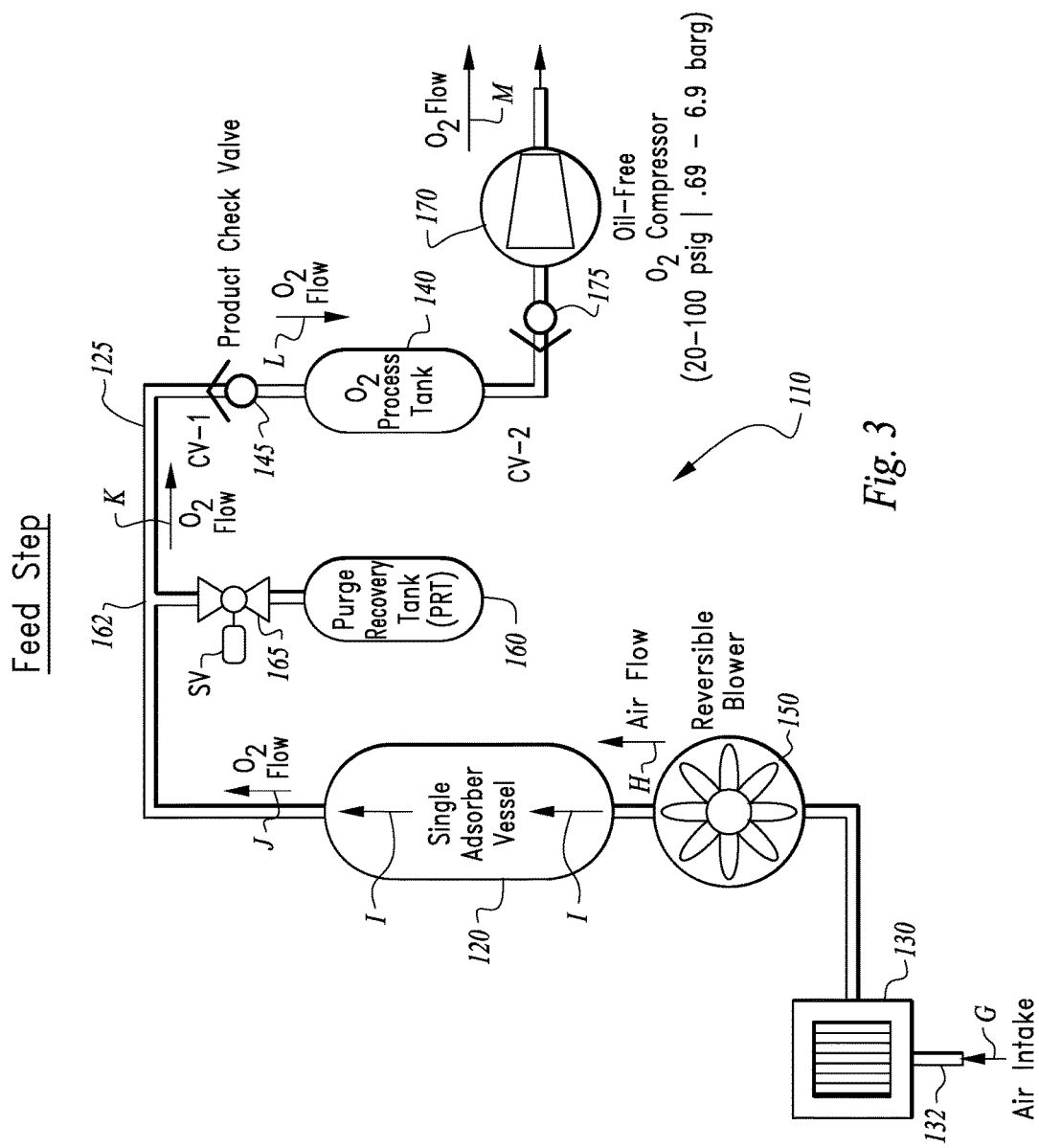
FIGS. 3-5 are schematics similar to that which is shown in FIG. 2, but with various different arrows depicting various steps in the operation of the reversing blower vacuum swing adsorption air separation unit.
Figure 5:
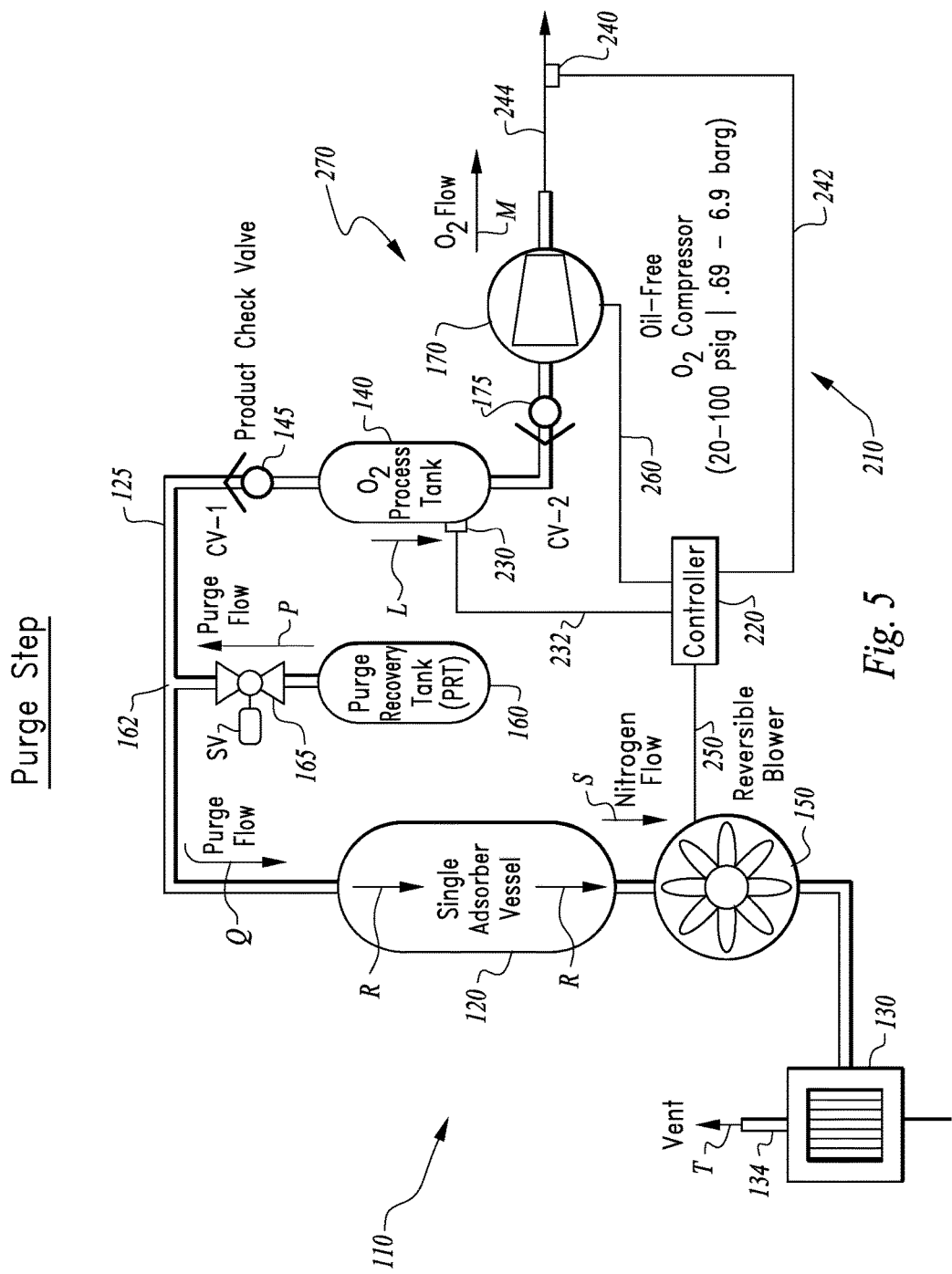

With particular reference to FIGS. 3-5, general steps in operation of the ASU 110 are described. FIG. 3 depicts a feed step for the ASU 110. In this step the reversible blower 150 draws air from the air intake 130 through the air port 132, along arrow G. The blower 150 drives air along arrow H into the vessel 120. The air passes through the vessel 120 (along arrow I) where nitrogen is selectively adsorbed. Gas of mostly $O_2$ flows out of the vessel 120 (along arrow J) and within the $O_2$ supply line 125. The control valve 165 of the purge recovery tank 160 is closed during the beginning of the feed step so that $O_2$ flow continues past the junction 162 and through the $O_2$ supply line 125 (along arrow K). The oxygen then passes through the product check valve 145 and into the $O_2$ process tank 140 (along arrow L). Further, the $O_2$ can flow through the compressor check valve 175 and through the compressor 170 for discharge from the ASU 110 (along arrow M).

Such a feed step (as depicted in FIG. 3) continues as long as the material within the vessel 120 has excess capacity for adsorption of nitrogen. When this adsorption material within the vessel 120 becomes saturated with nitrogen, the ASU 110 needs to prepare for recharging the adsorption material within the vessel 120. To detect that such recharging/restoration of the material within the vessel 120 is needed, the ASU 110 can follow a timing circuit or follow gas flow valves which measure an amount of gas flow, or can include a nitrogen sensor or other sensor downstream of the vessel 120 which indicate that the gas downstream of the vessel 120 is indicative that recharging/reconditioning of the material within the vessel 120 is needed.

Preparation for recovery of the material within the vessel 120 can occur in a couple of slightly different but closely related ways. In one embodiment, such preparation begins by opening of the control valve 165 (or valve 167). The interior of the pressure recovery tank 160 preferably has pressure below atmospheric pressure so that gas of mostly oxygen (but with perhaps some nitrogen present) flows quickly into the purge recovery tank 160 through the control valve 165.

When the purge recovery tank 160 is full, or when the purge recovery tank 160 is achieving a fill level which is sufficiently great to satisfy its purposes in purge recovery for the vessel 120, the control valve 165 is closed. The purge recovery tank 160 thus contains and holds a charge of mostly $O_2$ (but typically with some $N_2$ and other contaminates present) as a purge charge which can be at near atmospheric pressure, or conceivably above atmospheric pressure if pressure downstream of the vessel 120 is above atmospheric pressure.

The reversible blower 150 is instructed to reverse so that air is no longer driven into the vessel 120, but the blower 150 reverses and gases begin to be pulled out of the vessel 120, through the reversible blower 150 and back to the intake 130. The precise moment of beginning reversing of the reversible blower 150 could be before the control valve 165 associated with the purge recovery tank 160 has closed, or could be at the same time that the control valve 165 closes, or could be slightly after the control valve 165 closes. The reversible blower 150 typically takes some time to stop moving in a forward direction and then begin moving in a reverse direction. This slow down to zero velocity and speed up in a reverse direction also define a time period which can be during which the control valve 165 closes or immediately before or immediately after the control valve 165 closes.

The reversible blower 150 then operates in a reverse direction drawing a vacuum on the adsorber vessel 120 and portions of the $O_2$ supply line 125 between the adsorber vessel 120 and the product check valve 145 or other valve on the $O_2$ supply line 125 which resists the draw of vacuum within the $O_2$ supply line 125. Pressure is thus reduced within the $O_2$ supply line 125 and the adsorber vessel 120. Gas flow through the vessel 120 occurs along arrow R of FIG. 5. As the pressure is reduced within the adsorber vessel, the ability of the material within the vessel 120 to hold $N_2$ decreases. $N_2$ is thus released from the adsorber material and flows, along arrow S (FIG. 5) through the reversible blower 150 and out of the purge port 134 of the intake 130 (along arrow T of FIG. 5). After a sufficient amount of time and sufficiently low pressure is achieved within the vessel 120 to satisfactorily allow the material within the vessel 120 to recover, the ASU 110 then undergoes preparation for re-reversing the reversible blower 150 and returning the ASU 110 back to the feed mode (FIG. 3). This preparation typically initially involves opening of the control valve 165 (or valve 167) associated with the purge recovery tank 160. The mostly $O_2$ (with some $N_2$) gas that has been stored therein is thus released through the control valve 165 and into the $O_2$ supply line 125 (or directly into the vessel 120 through the valve 167 of FIG. 2).

This purge of mostly $O_2$ with other gases into the low pressure vessel 120 allows for pressure within the vessel 120 to be quickly restored and also for the low quality purge gas which contains some $N_2$ and other contaminant gases therein to again contact the adsorption material within the vessel 120 for removal of $N_2$ and other contaminants therefrom. Such purge flow is generally depicted by arrow P and also be arrow Q for return back into the adsorber vessel 120 (FIG. 5).

The vessel 120 has thus been fully prepared for returning back to the feed step. The reversible blower 150 can then be re-reversed to again drive airflow (along arrow H of FIG. 3) from the intake 130 (along arrow G) and through the vessel 120 (along arrow I). The control valve 165 with the purge recovery tank 160 can be closed just before the reversible blower 150 re-reverses, at the same time that the reversible blower 150 re-reverses, or shortly after the reversible blower 150 re-reverses.

Various factors such as the volume of gas which can reside within the various lines adjacent to the purge recovery tank 160 and whether the ASU 110 is to be optimized for $O_2$ purity, energy efficiency, or production rate, can be factored into determining precisely when the control valve 165 (or 167) should be returned to its closed state. Similar optimization can occur when determining when to initially open the control valve 165 and also when to initially close the control valve 165. The control valve 165 is re-closed so that it maintains a vacuum therein to make the purge recovery tank 160 most effective when it is again utilized in the next iteration of the cycle performed by the ASU 110.

With further reference to FIG. 5, details of a load following system 210 are disclosed in a preferred embodiment, which allows the air separation unit 110 or similar adsorption based air separation units (such as system 10 of FIG. 1) to be controlled to maintain efficient and reliable operation even when $O_2$ demand is variable, such as to facilitate a turndown ratio of fifty percent, seventy-five percent or more. The load following system 210 includes a controller 220 which is coupled to at least one pressure sensor 230 located in an $O_2$ storage region downstream of the adsorption bed, depicted by the single adsorber vessel 120. Most preferably, a second pressure sensor 240 is also provided further downstream within the $O_2$ storage region and downstream of the adsorber vessel 120.

This $O_2$ storage region 270 can generally be considered to include $O_2$ flow lines downstream of the adsorber vessel 120, any purge recovery tank 160, an $O_2$ process tank 140 or other buffer tank, a compressor 170 and various $O_2$ handling lines therebetween and downstream thereof. The second pressure sensor 240 is preferably located downstream of the compressor 170, and along a product line 244 through which $O_2$ is discharged from the air separation unit 110.

The first pressure sensor 230 includes a data path 232 which feeds pressure sensor data to the controller 220. The second pressure sensor 240 includes a data path 242 supplying second pressure sensor data from the second pressure sensor 240 to the controller 220. The controller 220 outputs control signals including a blower control signal 250 and a compressor control signal 260. While in simplest forms of this invention a single pressure sensor somewhere within the $O_2$ storage could be fed to the controller 220 and a single control signal, such as the blower control signal 250, could be utilized, most preferably the controller 220 receives at least two pressure sensor signals at two separate locations within the $O_2$ storage 270 downstream of the adsorber vessel 120, and supplies two separate control signals 250, 260 to control flow rates within the reversing blower air separation unit, such as the SBRB VSA air separation unit 110.

Figure 6:
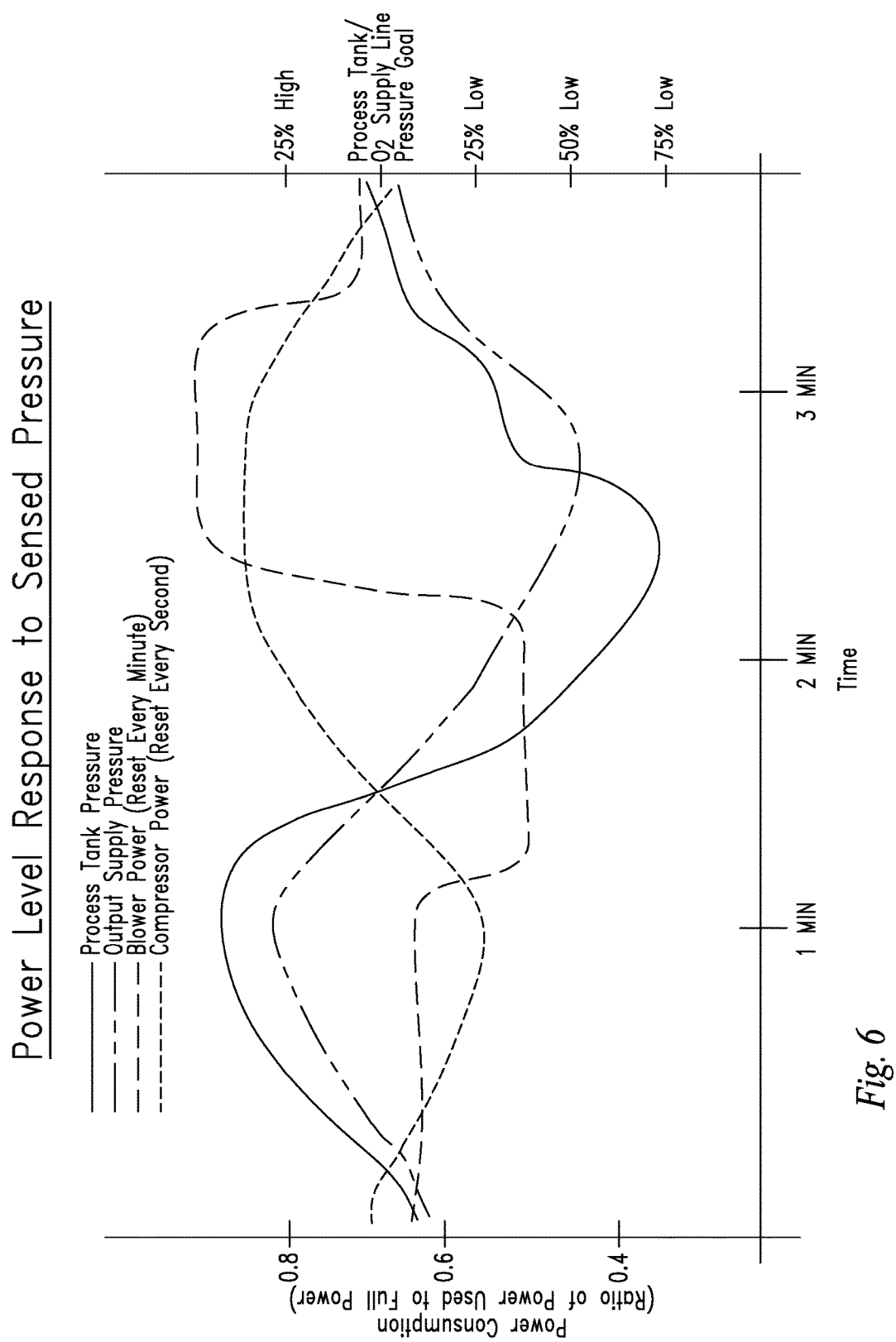
FIG. 6 is a graph of power level response to sensed pressure illustrating how pressure sensed at first and second sensor locations depicted in FIG. 5 cause changes in power consumption of a drive of a reversible blower and a drive of a compressor, for automatic and reliable $O_2$ demand load following according to this invention.

With particular reference to FIG. 6, exemplary details of sensed pressure at the two sensor 230, 240 locations are depicted along with power level control signals generated by the controller 220 in response. FIG. 6 is a graph of power consumption and sensed pressure versus time. Power consumption is actually power consumed by the reversible blower and also power consumed by the compressor 170. While these elements have significantly differing power consumptions, power consumption is depicted as a ratio of "power used" to "full power." Thus, the power consumption values appear to be similar to each other. As an example, the reversible blower might have a full power consumption rate of ten kilowatts. When the blower is being powered at seven kilowatts a value of 0.7 would be depicted in the graph of FIG. 6. On the same graph, if the compressor has a full power rate of one kilowatt and is currently operating at seven hundred watts, it would also display a power consumption of 0.7 in the graph of FIG. 6.

Similarly, the pressure data graphed on the common graph is not graphed in terms of actual pressure measured, but rather relative to a "pressure goal" also referred to as a set point for a typical pressure to be sensed at the first and second locations. This set point is not a maximum allowable pressure, but rather an optimal pressure or some other arbitrary pressure value, with the system capable of handling pressure higher than that of the pressure goal or lower than that of the pressure goal. In one embodiment, an acceptable range of pressures could be utilized instead, with the set point being a midpoint in this range or some other point in this range. Again, the first and second pressures are typically different from each other (although they could be similar), but are normalized relative to their set points. For instance, if the first pressure set point is 10 psig and the sensed pressure is 7.5 psig, a value of twenty-five percent low would be graphed on the graph of FIG. 6. Correspondingly, if the pressure set point at the second location is 5 psig and the actual pressure sensed is 3.75 psig, the pressure graphed for the second location would also be at "twenty-five percent low."

Study of the graph of FIG. 6 indicates how sensed pressure at the first location and the second location might vary somewhat in a particular instance. Pressure values depicted herein are pressure at a process tank 140 (or other buffer tank) and pressure at an output/supply, such as at the product line 244. Factors influencing pressure at these locations include demand for $O_2$. Because the output/supply pressure is closest to the source of the $O_2$ load, the output/supply pressure is likely to be most influenced by $O_2$ demand. Other factors which influence pressure at the output/supply include the current flow rate of $O_2$ being delivered from the compressor, and to some extent whether the SBRB VSA air separation unit 110 is currently operating in a feed mode or in a recovery mode, and the fullness of the process tank 140. Pressure in the process tank 140 at the second location is influenced to some extent by $O_2$ demand, but because it is closer to the adsorber vessel 120 and reversible blower 150, it is more responsive to whether the air separation unit 110 is currently in a feed mode, in a recovery mode, in a purge mode, or in some transition therebetween.

To maintain reliable operation, the blower power control signal acting in response to process tank pressure and the compressor power control signal operating responsive to output/supply pressure are two separate control loops having different time intervals. The time intervals are elapsed time between when the control loop sends a new signal to the blower or compressor to have power consumption altered. In the example depicted in FIG. 6, the compressor power control has a time constant on the order of one second while the blower power control signal has a time constant on the order of one minute. In the graph of FIG. 6, the blower power level thus makes adjustments every minute, but otherwise maintains relatively constant power consumption. In contrast, the compressor power appears to be changing continuously in that it is changing approximately once every second.

When a time constant is referred to as approximately one second or approximately one minute, it is contemplated that such an approximate value might be up to five times greater or lesser than these values. For instance, with regard to a time constant of approximately one second, a range between 0.2 seconds and five seconds is contemplated. For a time constant of approximately one minute, a range of between 0.2 minutes and five minutes is contemplated.

By keeping these time constants distinct from each other a variety of benefits are provided. First, excessive overreaction of the reversible blower 150 to sense demand can cause the VSA ASU 110 to overreact and slow the separation process down too quickly and cause a loss in purity of $O_2$. If the time constants are too slow, the potential for a rapid drop in demand can result in $O_2$ needing to be released from an overpressure port before the load following system 210 can effectively respond and reduce a rate of production. Furthermore, keeping the time constants similar has the propensity for the blower to follow the compressor rather than to follow actual demand. The potential for instability within the control system is thus increased. Such instability can require multiple changes in power consumption which are unnecessary, or for the control system to fail altogether and fall back onto override shut down circuitry or other circuitry which have the potential to take the ASU 110 offline.

Figure 7:
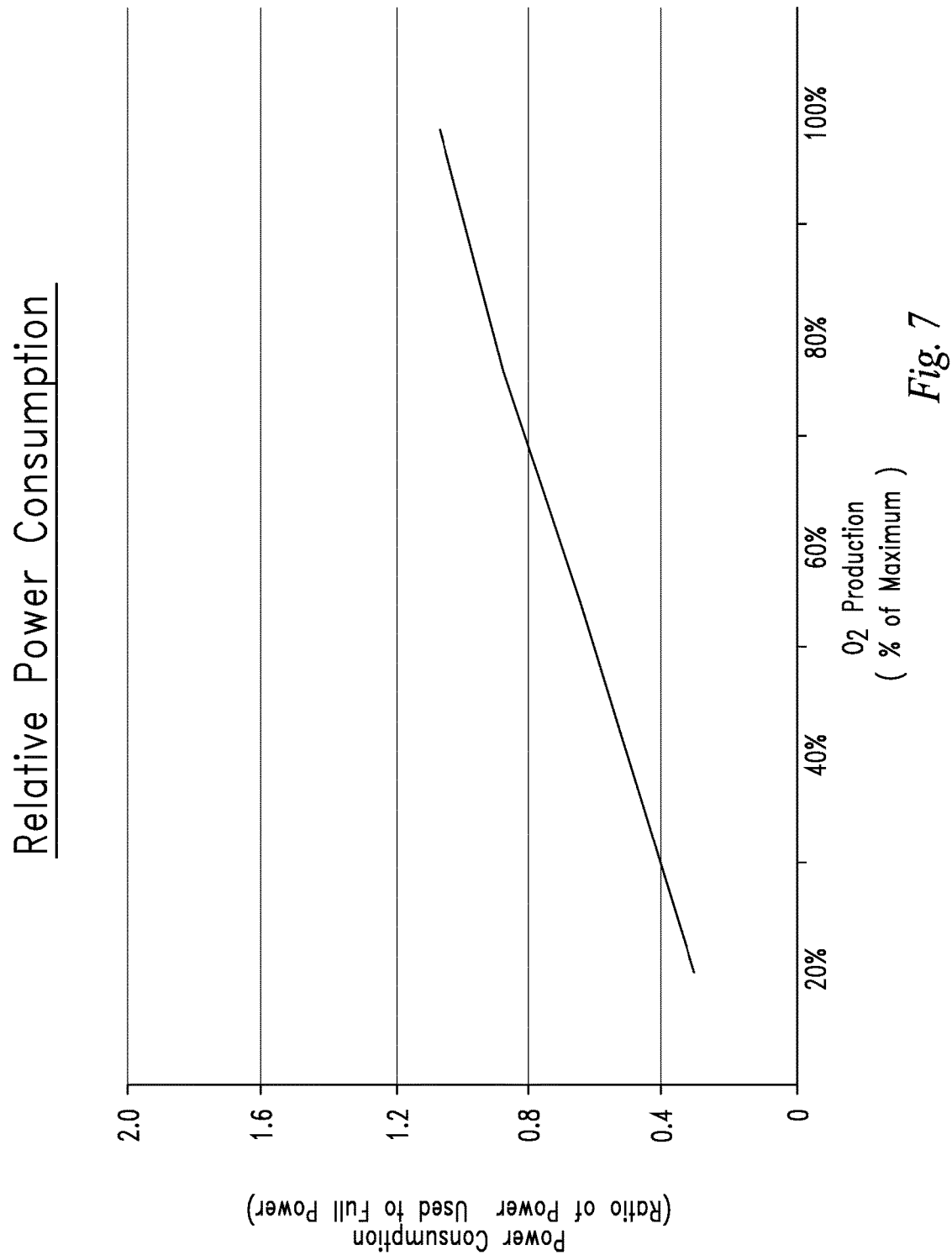
FIG. 7 is a graph of relative power consumption versus $O_2$ production, illustrating how air separation unit production efficiency is generally maintained even with a turndown ratio of seventy-five percent or more.

Most preferably, motors driving the compressor 170 and blower 150 are variable frequency drives. Such drive motors can have their power consumption readily adjusted and corresponding flow rates can also be readily adjusted, while efficiency can be maintained. Because the blower 150 and compressor 170 are each preferably positive displacement flow inducing devices, the variable frequency drive motors can merely have their output shaft rotation rates modified, and flow rates are correspondingly modified, while efficiency is maintained to a great extent. For instance, reduction of flow rate by fifty percent is accompanied by a fifty percent lesser draw of power. Thus, efficient operation can be maintained even when a fifty percent or seventy-five percent or more turn down ratio is required to meet changes in demand. FIG. 7 depicts a graph of power consumption versus $O_2$ production and illustrating how $O_2$ production reduction can occur with closely corresponding power consumption reduction, maintaining efficiency.

In many $O_2$ supply installations it is desirable to match supply of $O_2$ with the expected demand. Furthermore, there are benefits in utilizing standardized units, rather than having a large number of differently sized units grouped together. This can lead to suboptimal installations in some circumstances. For instance, if a facility requires sixty tons per day (TPD) of oxygen, and SBRB VSA air separation units are provided which have each unit supplying forty TPD, one would need to provide two air separation units. However, the system would be capable of producing more than it typically demanded. While it is possible to have one of the units operate part-time, or to configure the units so that they share the duty cycle and alternate in shutting down, it is also beneficial if the units can follow the load and have a turndown ratio while still maintaining efficiency. Thus, with this invention a sixty TPD demand can be met with two forty TPD units, with one unit operating at full capacity and the other unit operating at a turndown ratio of fifty percent. As demand fluctuates upwardly and downwardly, this turndown ratio can similarly be adjusted upwardly and downwardly, following the load. As an alternative, each of the units could be configured similarly to have a high turndown ratio while maintaining efficiency, so that they could each operate at approximately seventy-five percent of capacity when normal demand is experienced, and can act together or alternate in acting to meet demand changes utilizing the invention disclosed herein.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. An air separation process with load sensing and load following, including the steps of:
   sensing at least one pressure within a single adsorption bed air separation system having an air inlet upstream from a reversing blower and an $O_2$ storage downstream from the adsorption bed;
   said sensing step detecting pressure magnitude at a first location downstream from the reversing blower;
   altering a flow rate through the reversing blower responsive to the pressure of said sensing step; and
   increasing a flow rate through the reversing blower when pressure of said sensing step is below a set point;
   decreasing a flow rate through the reversing blower when the pressure of said sensing step is above the set point; and including the step of further sensing a second pressure at a second location downstream from the first location.

2. The air separation process of claim 1 wherein said first location is at a buffer tank downstream from the adsorption bed.

3. The air separation process of claim 1 wherein a compressor is located within the $O_2$ storage downstream of the adsorption bed, the second location downstream from the compressor.

4. The air separation process of claim 3 including the further step of altering a flow rate through the compressor responsive to the second pressure at the second location.

5. The air separation process of claim 4 wherein said altering a flow rate through the reversing blower step and said altering a flow rate through the compressor step each occur multiple times separated by passage of at least one time interval.

6. The air separation process of claim 5 wherein a time interval for said altering a flow rate through the reversing blower step and a time interval for said altering a flow rate through the compressor step are different from each other.

7. The air separation process of claim 6 wherein the time interval for control of the reversing blower is longer than the time interval for control of the compressor.

8. The air separation process of claim 7 wherein the time interval for control of the reversing blower is approximately every minute and the time interval for control of the compressor is approximately every second.

9. The air separation process of claim 5 wherein said altering a flow rate through the reversing blower step and said altering a flow rate through the compressor step include the steps of driving the reversing blower and the compressor with separate variable frequency drives and controlling a rotational speed of the variable frequency drives responsive to the pressure at the first location and the pressure at the second location.

10. An air separation method with load sensing and load following, including the steps of:
   sensing at least one pressure within a single adsorption bed air separation system having an air inlet upstream from a reversing blower and an $O_2$ storage downstream from the adsorption bed;
   said sensing step detecting pressure magnitude at a first location downstream from the reversing blower;
   altering a flow rate through the reversing blower responsive to the pressure of said sensing step;
   wherein said sensing step includes the step of increasing a flow rate through the reversing blower when pressure is below a set point;
   decreasing a flow rate through the reversing blower when the pressure of said sensing step is above the set point;
   wherein a compressor is located within the $O_2$ storage downstream of the adsorption bed; and
   including the further step of altering a flow rate through the compressor responsive to a second pressure at a second location downstream from the compressor.

11. The method of claim 10 wherein said altering a flow rate through the reversing blower step and said altering a flow rate through the compressor step each occur multiple times separates by passage of at least two time intervals; and
   wherein a time interval for said altering a flow rate through the reversing blower step and a time interval for said altering a flow rate through the compressor step are different from each other.

12. The method of claim 11 wherein said altering a flow rate through the reversing blower step and said altering a flow rate through the compressor step include the steps of driving the reversing blower and the compressor with separate variable frequency drives and controlling a rotational speed of the variable frequency drives responsive to the pressure at the first location and the pressure at the second location.

13. An air separation method with load sensing and load following, including the steps of:
   sensing at least one pressure within a single adsorption bed air separation system having an air inlet upstream from a reversing blower and an $O_2$ storage downstream from the adsorption bed;
   said sensing step detecting pressure magnitude at a first location downstream from the reversing blower;
   altering a flow rate through the reversing blower responsive to the pressure of said sensing step;
   increasing a flow rate through the reversing blower when pressure of said sensing step is below a set point;
   decreasing a flow rate through the reversing blower when the pressure of said sensing step is above the set point;
   providing a compressor located within the $O_2$ storage downstream of the adsorption bed; and
   further sensing a second pressure at a second location downstream from the first location and downstream from the compressor.

14. The load following air separation method of claim 13 including the further step of altering a flow rate through the compressor responsive to the second pressure at the second location;
   wherein said altering a flow rate through the reversing blower step and said altering a flow rate through the compressor step each occur multiple times separated by passage of at least two time intervals; and
   wherein time intervals for said altering a flow rate through the reversing blower step and for said altering a flow rate through the compressor step are different from each other.

15. The load following air separation method of claim 14 wherein the time interval for control of the reversing blower is longer than the time interval for control of the compressor.

16. The load following air separation method of claim 15 wherein the time interval for control of the reversing blower is approximately every minute and the time interval for control of the compressor is approximately every second.

17. The load following air separation method of claim 16 wherein said altering a flow rate through the reversing blower step and said altering a flow rate through the compressor step include the steps of driving the reversing blower and the compressor with separate variable frequency drives and controlling a rotational speed of the variable frequency drives responsive to the pressure at the first location and the pressure at the second location.

* * * * *